United States Patent [19]

Takemitsu

[11] 3,956,132

[45] May 11, 1976

[54] APPARATUS FOR PREPARING MINERAL WATER

[75] Inventor: Shiro Takemitsu, Osaka, Japan

[73] Assignee: Wakamizu Sangyo Kabushiki Kaisha, Osaka, Japan

[22] Filed: May 7, 1974

[21] Appl. No.: 467,724

[52] U.S. Cl. ................... 210/219; 210/DIG. 22; 23/267 C
[51] Int. Cl.² ........................................ B01D 11/00
[58] Field of Search ............... 210/49, 59, 60, 219, 210/263, DIG. 22, 178; 23/267 C

[56] References Cited
UNITED STATES PATENTS

| | | | |
|---|---|---|---|
| 1,013,761 | 1/1912 | Gavelack | 210/179 |
| 1,579,158 | 3/1926 | Smilie | 210/263 X |
| 2,709,643 | 5/1955 | Peery | 210/DIG. 22 |
| 2,734,804 | 2/1956 | Courthope et al. | 23/267 C |

FOREIGN PATENTS OR APPLICATIONS 446,989   3/1948   Canada.............................. 210/263

*Primary Examiner*—John Adee
*Attorney, Agent, or Firm*—Armstrong, Nikaido & Wegner

[57] ABSTRACT

An apparatus comprising a container for reserving drinking water, unweathered perlite or a like mineral immersed in the water in the container and a high-frequency generating means including a high-frequency generator and a generator plate thereof with at least part of the mineral in direct contact with the generator plate, which is in direct contact with the water such that high-frequency waves generated promote dissolving-out of metal ions from the mineral into the drinking water to rapidly mineralize the water.

1 Claim, 5 Drawing Figures

APPARATUS FOR PREPARING MINERAL WATER

BACKGROUND OF THE INVENTION

This invention relates to a novel apparatus for preparing mineral water from drinking water by causing magnesium ions, calcium ions and similar metal ions to dissolve out into drinking water.

The rain falling on the ground penetrates deep into the earth to form ground water and springs from the surface of the earth again. The spring water contains dissolved therein appreciable quantities of silicon, sodium, iron, calcium, potassium, magnesium and similar metals which are the main components of the crust and this water serves as mineral water suitable for animals and plants. The ground water collects to form streams and then rivers. The water in rivers and reservoirs provides a water source for water supply. The river water contains ammonia nitrogen and nitrite nitrogen from excrements and dead bodies of fishes and rotten vegetables and is not potable, unlike tap water, so that the water of rivers and reservoirs is treated to eliminate objectionable influences on man and animals, all as is well known.

It is further noted that even potable water like tap water contains some amounts of ammonia nitrogen and nitrite nitrogen, which tend to spoil the taste. Briefly, the lower the ammonia nitrogen and nitrite nitrogen contents in water, the more suitable the water is for living things. Accordingly, an attempt has been made to immerse a mineral such as unweathered perlite which contains magnesium, calcium and similar metal ions in tap water or similar drinking water, thereby causing the metal ions to dissolve out from the mineral into the water, to mineralize the drinking water, and the mineral water thus prepared is bottled and placed on sale. Such mineral water is free of deterioration even when reserved for a prolonged period of time, and is thus very advantageous to the growth of living beings and is also excellent in taste. However, known techniques used to artificially prepare mineral water having the above-mentioned outstanding features are primitive since the mineral is merely immersed in drinking water to permit the metal ions to dissolve into the water spontaneously. Thus the method heretofore employed is very inefficient from the viewpoint of mass production, with the result that the mineral water obtained becomes very expensive.

SUMMARY OF THE INVENTION

This invention has been accomplished in view of the foregoing situations.

An object of this invention is to provide an apparatus by which the metal ions contained in a mineral are positively dissolved out into drinking water, with the apparatus including high-frequency generating means for causing the metal ions to dissolve out from the mineral at an accelerated rate with the irradiation of high-frequency waves so as to artificially mineralize the drinking water with the metal ions.

Another object of this invention is to provide an apparatus by which a specified amount of drinking water reserved therein can be mineralized rapidly and effectively when desired to supply a desired amount of mineral water.

Another object of this invention is to provide an apparatus comprising a container of double-wall construction having an inner container of glass material for reserving drinking water to be mineralized and an outer container of stainless steel or similar metal material and high frequency generating means for dissolving out metal ions from a mineral into the water in which the mineral is immersed, the high-frequency generating means having a generator plate in contact with the water stored between the inner container and the outer container to irradiate the mineral with high-frequency waves indirectly through the water and to thereby cause the metal ions to dissolve out from the mineral, whereby the inner container for reserving the potable mineral water is rendered resistant to weak alkali to prevent degradation of the mineral water.

Another object of this invention is to provide an apparatus for preparing mineral water from drinking water reserved in the container which apparatus is adapted to effectively cool the product to supply cold and tasty mineral water.

Still another object of this invention is to provide an apparatus for preparing mineral water from drinking water which is simple in construction and compact for use in such places as coffee shops, hotels, etc., and which is inexpensive and easy to use.

The apparatus of this invention comprises a container for reserving drinking water, a mineral such as unweathered perlite to be immersed in the water in the container to mineralize the water with metal ions, and a high-frequency generating means including a high-frequency generator and its generator plate for causing the metal ions to dissolve out from the mineral at an accelerated rate. At least part of the mineral is in direct contact with the generator plate which is in direct contact with the water. The apparatus further includes means for drawing off the mineral water from the container. Further according to this invention, the container may have a double-wall construction comprising an inner container made of glass material and an outer container surrounding the peripheral side portion and bottom portion of the inner container, with a space formed between the inner and outer containers for reserving the water overflowing from the inner container. The generator plate of the high-frequency generating means is so disposed as to directly contact the water within the space, while the mineral is immersed in the water within the inner container.

These and other objects and features of this invention will become more apparent from the following description of the preferred embodiments given for illustrative purposes only with reference to the accompanying drawings.

DESCRIPTION OF THE PREFERRED EMBODIMENTS

Figure 1:
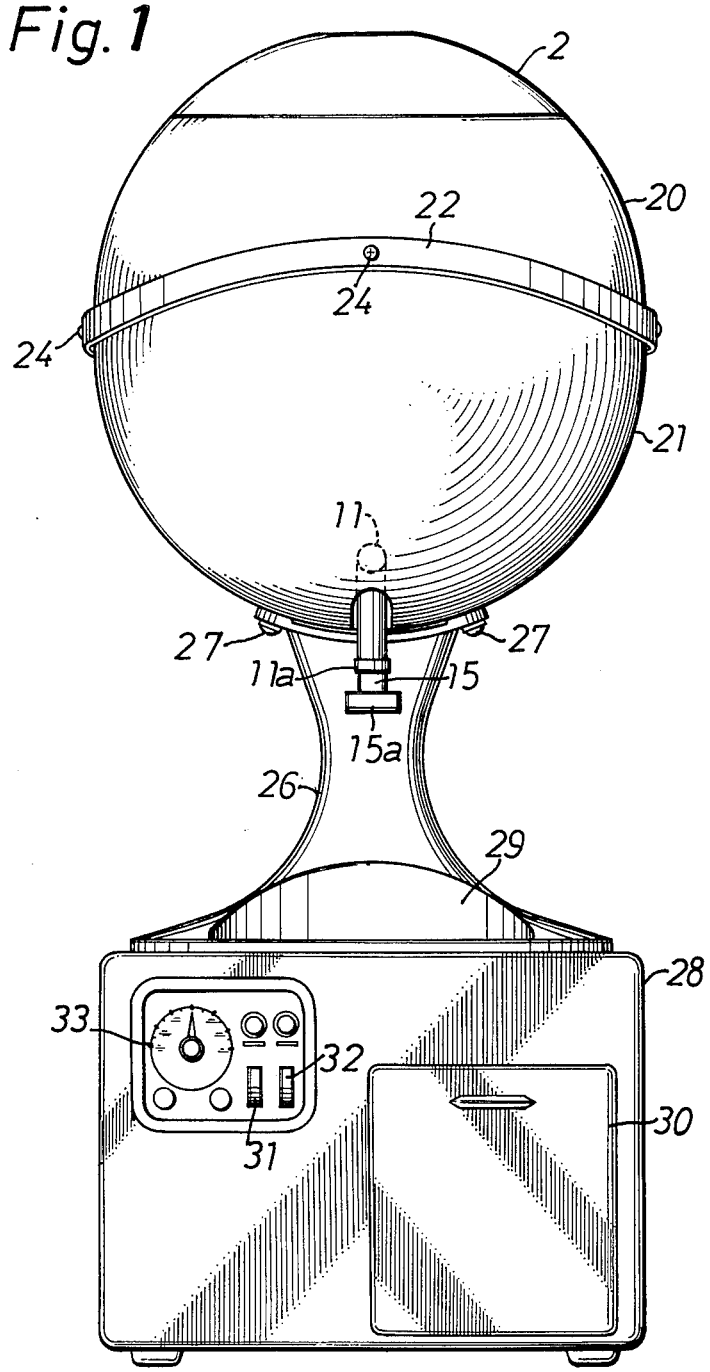
FIG. 1 is a front view showing a basic embodiment of the apparatus of this invention.
Figure 2:
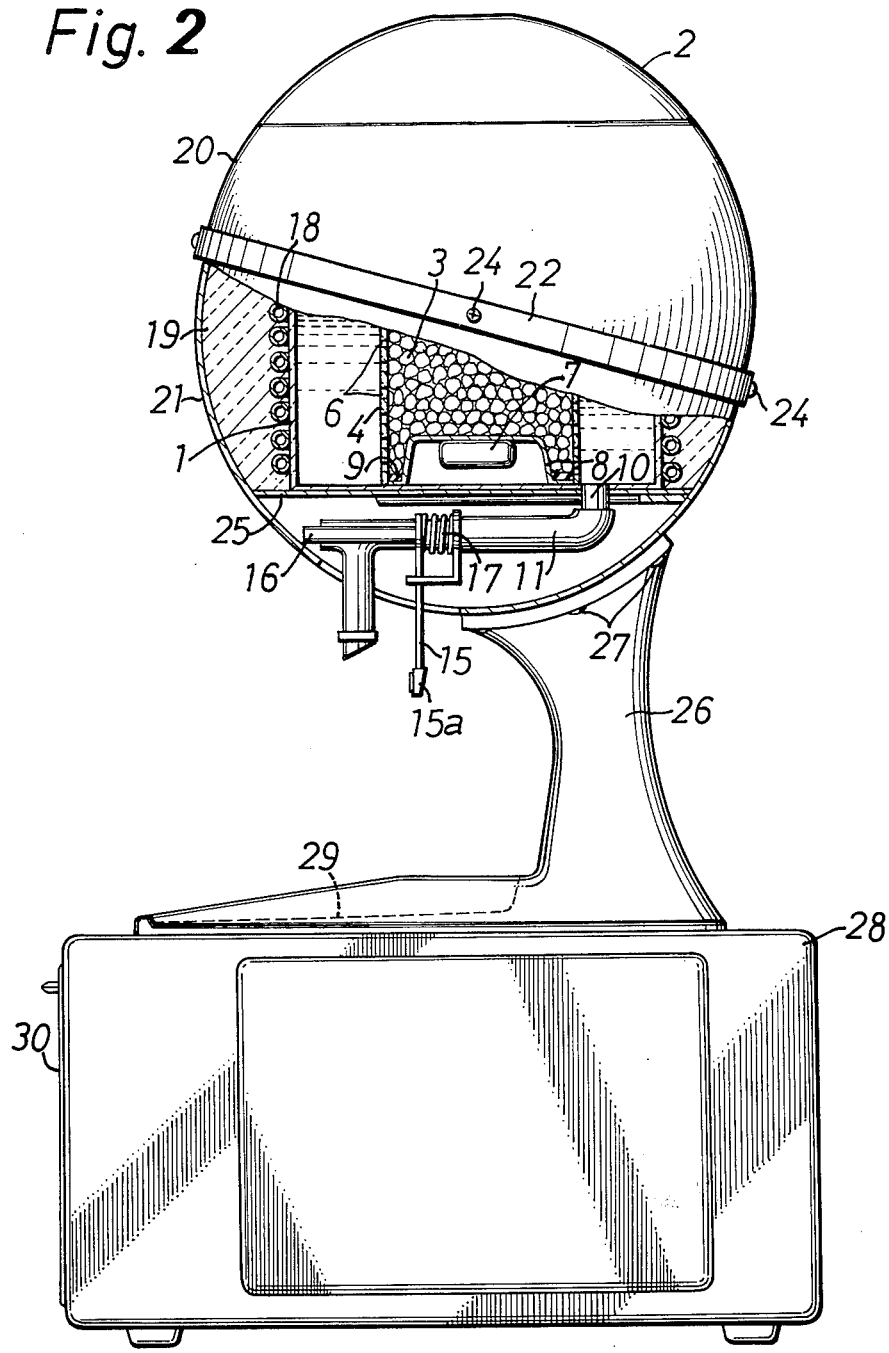
FIG. 2 is a side elevation partly broken away to show the principal part of the same.
Figure 3:
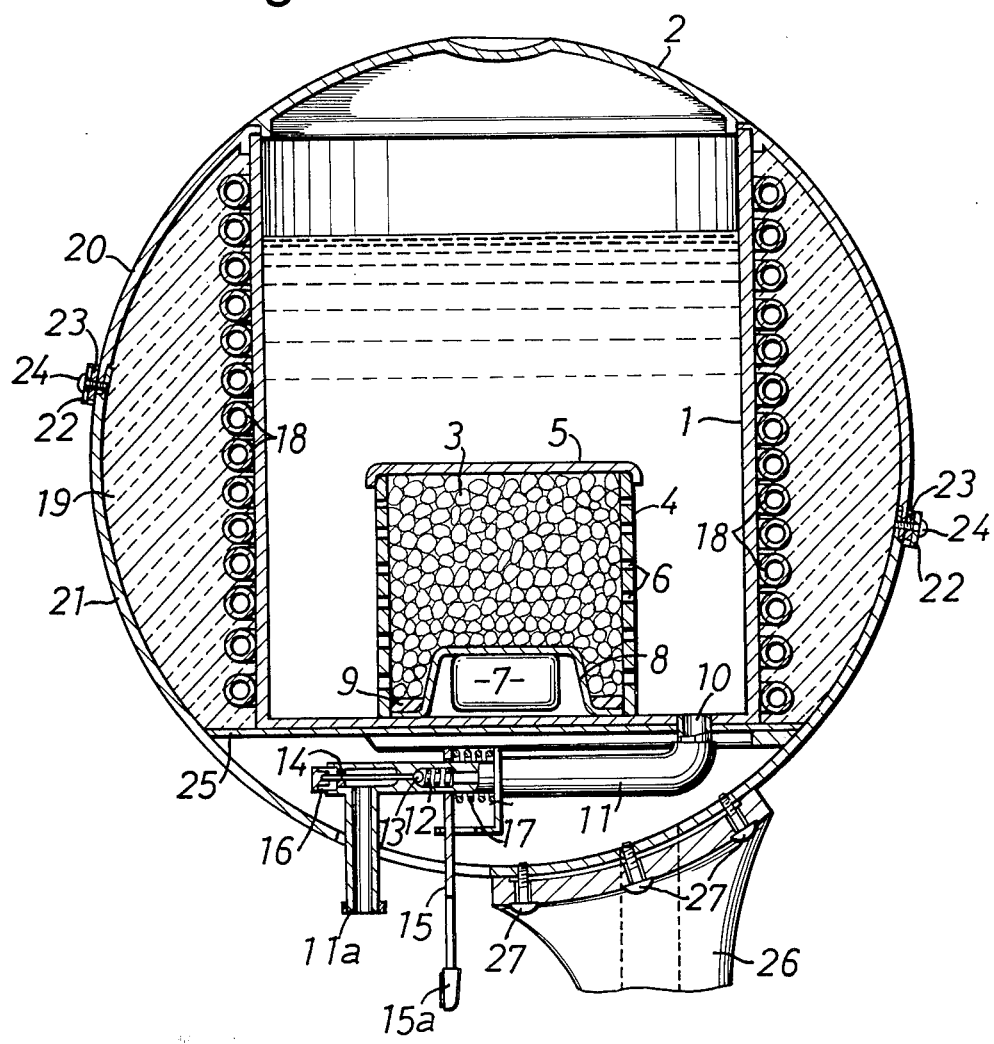
FIG. 3 is an enlarged side elevation in section showing the principal part.

With reference to FIG. 1 to 3, a basic embodiment of this invention will be described.

As seen in FIGS. 2 and 3, a cylindrical container 1 for reserving a predetermined amount of drinking water has a closed bottom and an open top and is made of corrosion resistant metal such as stainless steel. Drinking water is placed in the container 1 and a lid 2 is detachably arranged over the top opening of the container 1 to prevent invasion of foreign matters.

A mineral 3 such as unweathered perlite which contains magnesium, calcium and similar metal ions is placed at the center of the bottom portion of the container 1 as immersed in the water. The mineral 3 is in the form of lumps and is accommodated within a capsule 4 disposed at the center of the bottom portion of the container 1. Quantitative analysis of an example of the mineral 3 revealed that consisted of the following components:

| | |
|---|---|
| Silicic acid (as silicic acid anhydride ($SiO_2$)) | 71.94% |
| Aluminum (as aluminum oxide ($Al_2O_3$)) | 14.94 |
| Iron (as iron oxide ($Fe_2O_3$)) | 2.54 |
| Magnesium (as magnesium oxide (MgO)) | 0.44 |
| Calcium (as calcium oxide (CaO)) | 2.47 |
| Potassium and sodium (as alkali oxides ($K_2O + Na_2O$)) | 6.87 |
| Manganese (as manganese oxide (MnO)) | 0.03 |
| Phosphoric acid (as phosphoric anhydride ($P_2O_5$)) | 0.14 |
| Ignition loss | 3.43 |
| Weight loss on drying | 0.07 |
| Titanium and others | trace |

To prevent turbulent movement of the mineral 3 within the container, the capsule 4 is cylindrical and is provided with a cover 5 at its top. Furthermore to permit direct contact between the mineral 3 and water within the container, the peripheral side portion of the capsule is formed with a multiplicity of apertures 6 which are small enough to prevent the passage of the lumps of the mineral 3. The capsule 4 is made of the same material as the container 1. The water enters the capsule 4 through the holes 6 and comes into contact with the mineral 3, with the result that the metal ions contained in the mineral 3 are dissolved out into the water, whereby the water is mineralized. In this way, the metal ions are dissolved out spontaneously and therefore at a very slow rate. According to this invention, a means for generating high-frequency waves is employed to cause the metal ions to dissolve out from the mineral 3 into the water at an accelerated rate. The generating means comprises a high-frequency generator 7 and a generator plate 8. The generator plate 8 is in the form of a swollen portion is disposed at the center of the bottom of the capsule 4, with a vibration-preventing watertight rubber member 9 provided therearound. In the illustrated embodiment, the generator 7 is positioned in the space defined by the generator plate 8 and attached intimately to the center of the rear surface of the generator plate 8. The operation of the generator 7 causes the generator plate 8 to project high-frequency waves and to vibrate at the same time. Inasmuch as the generator plate 8 is in direct contact with part of the mineral 3, metal ions dissolve out into the water rapidly to mineralize the drinking water artificially. The vibration of the generator plate 8 moves the mineral 3 within the capsule 4 and brings all the lumps of mineral 3 into contact with the generator plate 8 uniformly. To draw off the mineralized water from the container 1, a discharge tube 10 extends downward from the bottom of the container 1 and is connected to a guide tube 11 which is generally L-shaped in side elevation. As seen in FIG. 3, a valve ball 13 spring-loaded as at 12 is housed in the guide tube 11. Fixed to the valve ball 13 is a valve rod 14 extending toward the free end of horizontal straight portion of the guide tube 11 axially thereof. The free end of the valve rod 14 and a handle 15 are connected together by tie rods 16 (see FIG. 2) disposed on the opposite sides of the guide tube 11 externally thereof and in parallel to its axis. The handle 15 extends downward from an intermediate portion of the tube 11 and is biased by a spring 17 wound around the guide tube 11. Accordingly, when the knob 15a of the handle 15 is pushed against the action of the spring 17, the valve rod 14 which is connected to the handle 15 by the tie rods 16 is moved in the same direction as the handle 15 in the axial direction, permitting the valve ball 13 to move out of contact with the valve seat against the spring 13 and thereby allowing the mineral water to flow out of the container 1 by way of the discharge tube 10 and guide tube 11. The lid 2 is then removed to replenish the container 1 with water.

To cool the mineral water in the container 1, a cooling pipe 18 for passing a coolant is fixedly wound around the peripheral side wall of the container 1, i.e. around the outer wall of the container 1 as seen in FIGS. 2 and 3. For improved cooling efficiency, the container 1 having the cooling pipe 18 wound therearound is wrapped with a heat insulating material 19 such as styrene foam which is further surrounded by a covering. The covering is in the form of a truncated sphere having the top cut off by a horizontal plane. As illustrated, the covering comprises a first covering member 20 and a second covering member 21 which are separably fitted together. The fitted portion is surrounded by an annular member 22 with a spacer 23 interposed therebetween and is fastened by screws 24. The truncated portion of the covering is provided with the aforementioned lid 2 to render the apparatus spherical in its entirety. At a position some distance above the bottom of the second covering member 21, there is a support 25 for the container 1. A desired space is formed under the support 25 to almost completely house the guide tube 11 and related members. The knob 15a and the outlet 11a of the guide tube 11 are left exposed from the covering.

As shown in FIG. 3, a support leg 26 is fixed by screws 27 to the covering, i.e. to the second covering member 21. It will be seen in FIG. 2 that the support leg 26 is L-shaped in side elevation and is seated in a fixed manner on the top of a base frame 28. In this way, the support leg and base frame support the overall apparatus including the container 1, mineral 3, etc.

The base portion of the support leg 26 is recessed (see FIG. 1) to form a cup receiving portion 29 so that the mineral water run off from the outlet 11a can be conveniently received by a cup. The receiving portion is downwardly inclined toward the front, whereby the droplets of water from the outlet 11a or the water overflowing from the cup is guided toward the front. The water is then allowed to flow down through a drain hole (not shown) in the receiving portion 29 and is reserved in a receptable 30 (see FIG. 1) housed in and withdrawable from the base frame 28.

Housed in the base frame 28 are a compressor, condenser, electromagnetic switch, liquid receptacle, means for operating the high-frequency generator and similar essential devices. These devices are actuated by turning on switch members 31 and 32 of the push type as illustrated in FIG. 1. A timer 33 is provided to set the time taken to mineralize the water in the container 1 which, time varies with the capacity of the container.

According to the basic construction of the present apparatus, the container 1, capsule 4 and the like are coated with Teflon on the surfaces thereof which are to be brought into contact with the reserved water to give these members resistance to weak alkali. When such coating fails to give satisfactory resistance, the present invention may be practiced according to another preferred mode of embodiment shown in FIGS. 4 and 5.

Figure 4:
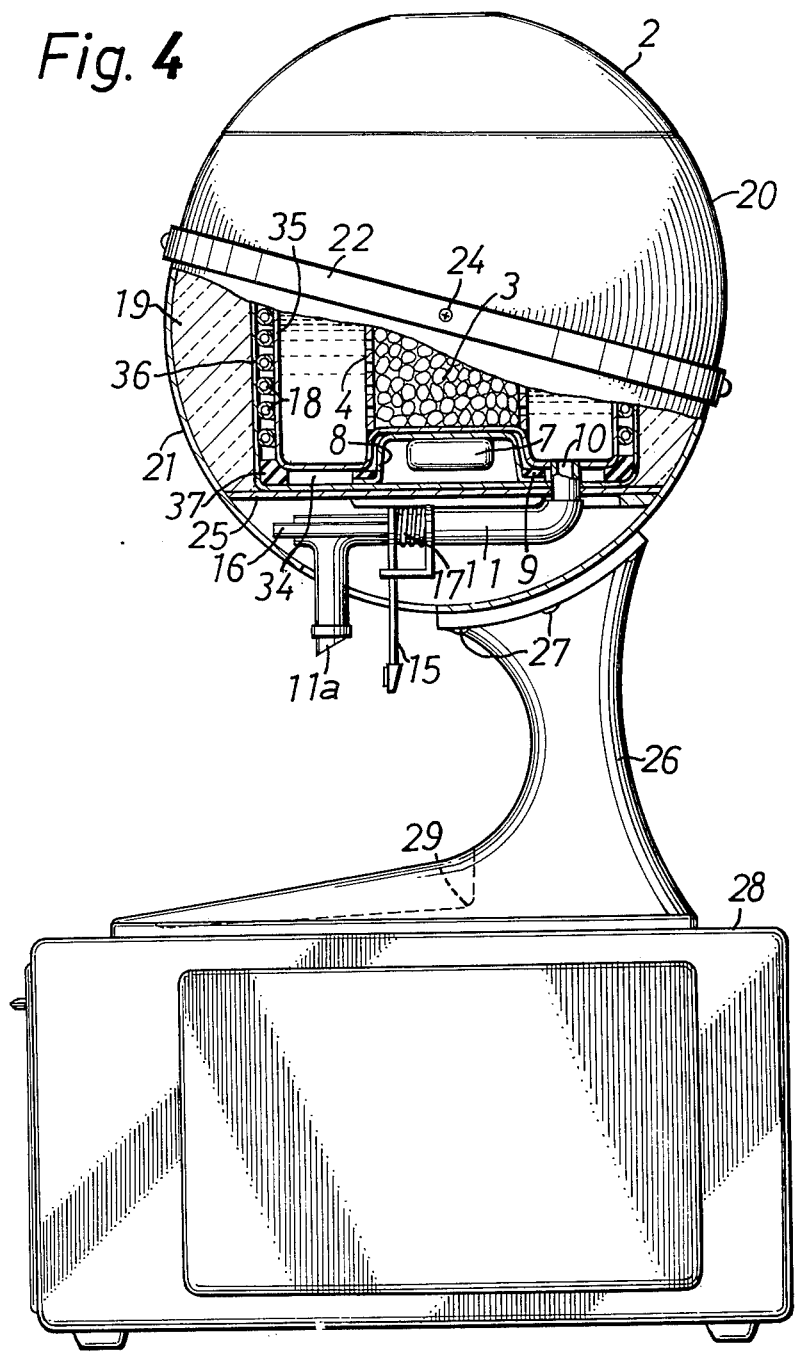
FIG. 4 is a side elevation of another embodiment of this invention with part broken away to show its principal part.
Figure 5:
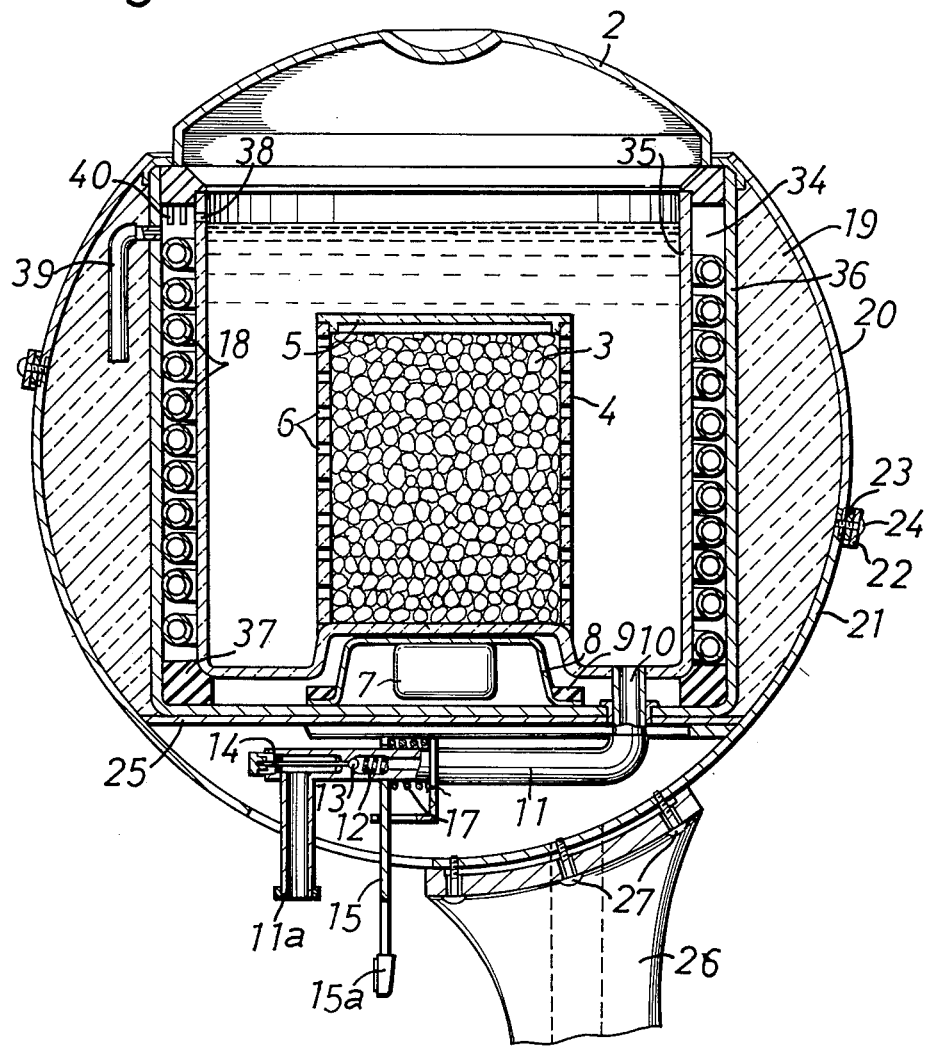
FIG. 5 is an enlarged side elevation in section showing the principal part of the same.

Basically, the apparatus shown in FIGS. 4 and 5 has the same construction as the foregoing embodiment. In these figures, like parts and members are referred to by the same reference numerals as in the foregoing embodiment, and different portions only will be described below.

Inside a container for reserving drinking water, there is provided an inner container 35 in a face-to-face relation to the peripheral side portion and the bottom portion of the container, with a specified space 34 formed therebetween. In other words, the container is of a double-wall construction having the inner container 35 and outer container 36. The inner container 35 is fixed to the outer container 36 with a rubber or like support member 37 interposed therebetween, so that the predetermined space 34 is formed between the surrounding outer container 36 and the peripheral side portion and bottom portion of the inner container 35. The outer container 36 is mounted on the support 25. The inner container 35 made of glass material has a swollen center bottom portion, on which is seated a capsule 4 similarly made of glass material and packed with a mineral 3.

The inner container 35 is formed, in its upper peripheral portion, with holes 38 for permitting the overflow of water from the inner container into the space 34 to fill the space 34 with water. Excess water is run off through a drain tube 39 which is partly shown in FIG. 5. A high frequency generating means is disposed at the center of bottom of the space 34. As shown in FIG. 5, the generator plate 8 thereof is slightly spaced apart from and is therefore out of contact with the inner container 35. Consequently, the water filling the space 34 after overflowing from the inner container 35 comes into direct contact with the generator plate 8. When actuated, the generator 7 projects high-frequency waves through the generator plate 8, with the result that the mineral 3 is irradiated with the high-frequency waves indirectly via the water in the space 34 and the inner container 35, causing the metal ions to be dissolved out from the mineral 3 into the water in the inner container 35 to mineralize the water. A cooling pipe 18 provided in the space 34 to cool the mineral water is fixed to the outer container 36 of stainless steel, since the inner container 35 is made of glass material. Thus the mineral water in the inner container 35 is cooled through the water remaining in the space 34. Projection of high-frequency waves directly onto the inner container 35 made of glass material will reduce the efficiency and cause possible breakage of the container. To avoid such objections, water is retained in the space 34. Even when remaining for a prolonged period of time, the water will not produce an adverse effect on the mineral water, since it is separated from the remaining water by the inner container 35. Preferably, the space 34 is fully filled with water all the time, inasmuch as the cooling pipe 18 is provided to cool the mineral water within the inner container 35. For this purpose, the apparatus includes a sensor 40 for detecting the water filling the space 34 to capacity, such that while the sensor 40 is in contact with the water in the space 34 the cooling means is rendered operable, whereas otherwise it is held inoperable.

According to the first feature of this invention, the mineral in a container is in direct contact with water therein, permitting metal ions to be dissolved out from the mineral into the water to produce mineral water which is odorless and tasty like natural spring water. The irradiation of the mineral with high-frequency waves in contact with the high-frequency generator plate promotes the dissolving-out of the metal ions and makes it possible to artificially prepare a desired amount of mineral water as needed. After the desired amount of mineral water is drawn off, the drinking water is replenished, followed by mineralization again. Through the repetition of such a procedure, mineral water is available in an endless fashion. According to the second feature of this invention, the container for reserving mineral water is made free of attack by weak alkali, and the water, when mineralized as desired, can be kept intact effectively. Moreover, the container has improved durability and is serviceable free of any trouble because of its double construction which is designed to subject the mineral to high-frequency irradiation always through water when mineralizing drinking water.

The foregoing embodiments are given for illustrative purposes only. Various modifications and improvements can of course be made in the overall shape and construction of the apparatus of this invention without departing from the scope of this invention.

What is claimed is:

1. An apparatus for preparing mineral water from drinking water, comprising a container for reserving the drinking water, water, a mineral immersed in the water in the container to mineralize the water with metal ions, a high frequency generator means and a generator plate for causing the metal ions to dissolve out from the mineral at an accelerated rate, at least part of the mineral being in direct contact with the generator plate, the generator plate being in direct contact with the water and the generator means, and means for drawing off the mineral water from the container, wherein the contents has a double-wall construction, including an inner container and an outer container surrounding the peripheral side portion and bottom portion of the inner container, with a space formed between the inner and outer containers for reserving the water overflowing from the inner container, the mineral being immersed in the water within the inner container, and wherein said mineral is located within an enclosure in said inner container such that the generator plate directly contacts at least a portion of the enclosure.

* * * * *